United States Patent
Asai et al.

(10) Patent No.: US 7,497,096 B2
(45) Date of Patent: Mar. 3, 2009

(54) APPARATUS AND METHOD FOR CONVEYING CURVED GLASS SHEETS

(75) Inventors: Osamu Asai, Mie (JP); Yoshiki Katada, Mie (JP); Kenji Ujiie, Mie (JP)

(73) Assignee: Central Glass Company, Limited, Ube-shi (JP)

( * ) Notice: Subject to any disclaimer, the term of this patent is extended or adjusted under 35 U.S.C. 154(b) by 508 days.

(21) Appl. No.: 10/792,573

(22) Filed: Mar. 4, 2004

(65) Prior Publication Data

US 2004/0261456 A1    Dec. 30, 2004

(30) Foreign Application Priority Data

Jun. 30, 2003    (JP)   .............. 2003-188219

(51) Int. Cl.
| | |
|---|---|
| C03B 13/16 | (2006.01) |
| C03B 13/00 | (2006.01) |
| B65G 13/00 | (2006.01) |
| B65G 21/10 | (2006.01) |
| B65G 41/00 | (2006.01) |
| C03B 23/033 | (2006.01) |

(52) U.S. Cl. .................. 65/370.1; 65/253; 65/106; 193/35 SS; 193/35 R; 193/37; 198/586; 198/782; 198/861.1

(58) Field of Classification Search .......... 193/35 SS, 193/35 R, 37; 198/584, 586, 782, 861.1
See application file for complete search history.

(56) References Cited

U.S. PATENT DOCUMENTS

| | | | |
|---|---|---|---|
| 2,348,887 A | * | 5/1944 | Drake ................... 65/106 |
| 3,409,422 A | | 11/1968 | Gulotta |
| 4,123,246 A | * | 10/1978 | Johnson ................. 65/104 |
| 4,138,933 A | * | 2/1979 | Helm ................... 493/246 |
| 4,139,359 A | * | 2/1979 | Johnson et al. .......... 65/107 |
| 4,540,426 A | | 9/1985 | Bocelli et al. |
| 4,556,406 A | * | 12/1985 | Kahle ................... 65/106 |
| 5,595,283 A | * | 1/1997 | Whetsel ............... 198/812 |
| 5,928,398 A | * | 7/1999 | Lehto .................. 65/104 |
| 6,014,873 A | | 1/2000 | Hirotsu et al. |
| 6,397,634 B1 | * | 6/2002 | Takeda et al. ............ 65/102 |
| 2002/0148254 A1 | | 10/2002 | Nishitani et al. |
| 2003/0110801 A1 | | 6/2003 | Nishitani et al. |
| 2005/0061032 A1 | * | 3/2005 | Yoshizawa .............. 65/106 |

* cited by examiner

Primary Examiner—Steven P. Griffin
Assistant Examiner—Jason L. Lazorcik
(74) Attorney, Agent, or Firm—Crowell & Moring LLP

(57) ABSTRACT

An apparatus for conveying a curved glass sheet includes a disk roll conveyor and a roll conveyor set positioned downstream of the disk roll conveyor. The roll conveyor set has a plurality of roll conveyor units. In this apparatus, first and second adjusting devices are operable to provide the curved glass sheet with (a) a first conveyance route in which the disk roll conveyor and the roll conveyor set are in a horizontal position to provide a smooth horizontal conveyance surface or (b) a second conveyance route in which the disk roll conveyor is in a downward position and in which at least one roll conveyor unit at a downstream side of the roll conveyor set is in an upward position to provide a continuous concave conveyance surface.

7 Claims, 4 Drawing Sheets

APPARATUS AND METHOD FOR CONVEYING CURVED GLASS SHEETS

BACKGROUND OF THE INVENTION

The present invention relates to an apparatus and a method for conveying in a relatively short distance curved glass sheets having two-dimensional simple curvature or three-dimensional compound curvature.

There are several methods for bending glass sheets such as automotive window glass. In one method, a glass sheet is heated to become soft and bent by making the heated glass sheet sag by gravitation in a mold. In another method, a glass sheet is heated and then pressed by press molds. In still another method, a glass sheet is heated and bent while floatingly conveyed over hearth beds in a furnace. More specifically, while the glass sheet is conveyed over a series of hearth beds in a conveyance direction, hot gas is ejected toward the glass sheet so that the glass sheet is floated over the hearth beds. The hearth beds have upper surfaces curved along a plane perpendicular to the conveyance direction. The glass sheet is thus heated with the hot gas, gradually sags by gravitation and is bent according to the curvature of the upper surfaces of the hearth beds. In a subsequent stage, the bent glass sheet is quenched in a quenching unit. Alternatively, the glass sheet may be conveyed by a series of rolls in the furnace and bent according to the curvature of the rolls. This method may be referred to as "hearth roll bending method". A decision as to which method should be used is made depending on the size and curvature of bent glass sheets to be fabricated.

In the method using the hearth beds in the furnace (hereinafter referred to as a hearth bed bending method), it is necessary to fabricate in the same furnace glass sheets of a simple curvature, which are bent in a direction perpendicular to the conveyance direction, and glass sheets of a compound curvature, which also have a curvature in the conveyance direction. In order to maintain high productivity of the hearth bed bending method, it is desirable to have a production procedure that is capable of achieving a fast production procedure change upon switching the type of the glass sheets.

There are known several apparatuses for conveying glass sheets of a compound curvature (see U.S. Pat. No. 3,409,422 corresponding to Japanese Patent Examined Publication 49-10331; U.S. Pat. No. 4,540,426 corresponding to Japanese Patent Unexamined Publication 60-86042; and U.S. Pat. No. 6,014,873 corresponding to Japanese Patent Unexamined Publication 5-9037). It is described in these publications that glass sheets are bent into a compound curvature while they are continuously conveyed and that after cooling the glass sheets of a compound curvature are conveyed by an apparatus to a subsequent step.

It is disclosed in U.S. Pat. No. 3,409,422 that the level, at which glass sheets of a compound curvature are transferred to a conveyor roll, becomes inevitably low, since glass sheets are downwardly conveyed while they pass over the hearth beds and through the quenching unit. Thus, a lift-up apparatus should be used for making the level of the glass sheets higher as long as a conventional production line of a hearth bed bending method is used. This publication, however, does not have a specific description of a conveying mechanism for transferring glass sheets of a compound curvature from a low level position to a high level position after the quenching unit.

U.S. Pat. No. 4,540,426 discloses an apparatus for upwardly conveying glass sheets. During conveyance, the glass sheets are held between support rolls and holding rolls. This apparatus is necessarily provided with a disposition of two opposing rows of conveyor rolls and with a mechanism for adjusting and maintaining the distance between each two opposing rolls.

U.S. Pat. No. 6,014,873 discloses an apparatus for conveying glass sheets of a compound curvature. In this apparatus, a disc roll conveyor is connected at a position downstream of a quenching device in a manner to incline downwardly and tilt toward one side. As glass sheets of a compound curvature are conveyed on the disk roll conveyor, their position is changed from the tilted position to a horizontal position. Then, the glass sheets are transferred to an upwardly inclined belt conveyor and then to a post-treating horizontal belt conveyor. It is, however, difficult to smoothly convey curved glass sheets by this apparatus, when the level of the outlet of the quenching device is considerably different from that of the upstream end of the post-treating horizontal belt conveyor. To prevent this difficulty, the upward slope of hearth beds is made steeper in this publication.

There are two proposals relating to hearth beds in a furnace for shortening the time required to change the conveyance of glass sheets having a simple curvature to that of glass sheets having a compound curvature and vice versa (see U.S. Patent Application Publication No. 2002/0148254 A1 corresponding to Japanese Patent Unexamined Publication 2002-316828; and U.S. Patent Application Publication No. 2003/0110801 A1 corresponding to Japanese Patent Unexamined Publication 2003-226532).

SUMMARY OF THE INVENTION

In the above-mentioned hearth bed bending and hearth roll bending methods, glass sheets are continuously bent while they are conveyed in a substantially horizontal direction from an upstream side to a downstream side. Therefore, these methods are very high in bending process efficiency and have a considerable merit of achieving a mass production with a low cost. It is not necessarily easy to convey curved glass sheets using apparatuses of such bending methods.

In producing glass sheets of a compound curvature, the curved glass sheets out of the final hearth bed or roll are conveyed downwardly. Therefore, a subsequent quenching unit is designed to have a downslope path. With this, curved glass sheets of a compound curvature coming out of the quenching unit are at a level lower than that of curved glass sheets of a simple curvature. Therefore, it is necessary to make the level of the former glass sheets higher to easily conduct a subsequent step. In case of alternately producing glass sheets of a simple curvature and those of a compound curvature by using the same single production line, a conveyance path between the outlet of the quenching unit and the subsequent step should be a horizontal conveyance route (first conveyance route) for conveying glass sheets of a simple curvature or an essentially V-shaped concave conveyance route (second conveyance route) for conveying glass sheets of a compound curvature. In other words, when the production mode is switched from that of glass sheets of a simple curvature to that of glass sheets of a compound curvature and vice versa, it is necessary to change the conveyance route. Furthermore, when the V-shaped concave conveyance route has a steep downslope and a steep upslope, the curved glass sheets may slip and fall down from the conveyor or stuck in the middle of the conveyor (particularly at a V-shaped boundary bottom position), thereby slowing down the conveyance.

It is therefore an object of the present invention to provide an apparatus and method for conveying curved glass sheets so that it is simple and easy to conduct replacement operations for producing glass sheets having different curvatures.

According to the present invention, there is provided an apparatus for conveying a curved glass sheet. This apparatus comprises:

a disk roll conveyor having (a) a plurality of disk rolls for conveying the curved glass sheet and (b) a first adjusting device for adjusting a height and an inclination angle of a conveyance surface of the disk roll conveyor such that the disk roll conveyor is capable of having a horizontal or downward position; and a roll conveyor set positioned downstream of the disk roll conveyor, the roll conveyor set having a plurality of roll conveyor units, each unit having (a) a plurality of rolls for conveying the curved glass sheet and (b) a second adjusting device for adjusting a height and an inclination angle of a conveyance surface of each unit, wherein the first and second adjusting devices are operable to provide the curved glass sheet with (a) a first conveyance route in which the disk roll conveyor and each roll conveyor unit are in a horizontal position to provide a smooth horizontal conveyance surface extending from an upstream end of the disk roll conveyor to a downstream end of the roll conveyor set, or (b) a second conveyance route in which the disk roll conveyor is in a downward position and in which at least one roll conveyor unit at a downstream side of the roll conveyor set is in an upward position to provide a continuous concave conveyance surface extending from the upstream end of the disk roll conveyor to the downstream end of the roll conveyor set.

According to the present invention, there is provided a method for conveying a curved glass sheet by using the above apparatus. This method comprises the steps of:

(a) operating the first and second adjusting devices to provide the first conveyance route when the curved glass sheet has a two-dimensional curvature, or the second conveyance route when the curved glass sheet has a three-dimensional curvature; and (b) conveying the curved glass sheet over the first or second conveyance route.

DESCRIPTION OF THE PREFERRED EMBODIMENTS

Herein, a glass sheet having a compound curvature is defined as a glass sheet of three-dimensional shape, especially curved with desired curvature radii relative to both X- and Y-axis directions and thereby being convex in a Z-axis direction according to the orthogonal coordinate system. A glass sheet curved simply relative to one direction to be part-cylindrical is referred to as a glass sheet having a simple curvature. Further, the terms "upstream" and "downstream" are defined in relation to a direction in which the glass sheet is conveyed on one production line.

Figure 1:
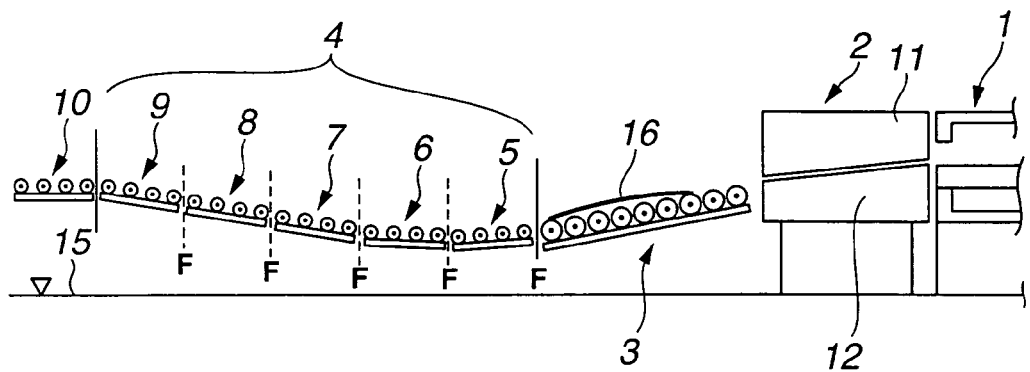
FIG. 1 is schematic side view showing a conveyance apparatus according to the present invention, in which the second conveyance route is provided.

Herein, "horizontal conveyance direction" refers to a horizontal direction of the conveyance of curved glass sheets from the upstream end of the disk roll conveyor 16 toward a horizontal fixed roll conveyor 10 of a subsequent step (see FIG. 1). In contrast, "conveyance direction" is an actual direction of the conveyance of curved glass sheets along the after-mentioned conveyance surface of the disk roll conveyor or each roll conveyor unit. Thus, the conveyance direction is the same as the horizontal conveyance direction in the case of the first conveyance route. In contrast, the conveyance direction in the case of the second conveyance route is defined along the second conveyance route, which is different from the horizontal conveyance direction.

Herein, "conveyance surface" of the disk roll conveyor or each roll conveyor unit may refer to a bottom surface of an imaginary flat plate that is placed on the disk rolls of the disk roll conveyor or on the rolls of each roll conveyor unit. The V-shaped boundary bottom of the second route refers to a boundary between the downslope and the upslope of the second conveyance route. One flat conveyance surface may independently be provided by the disk rolls of the disk roll conveyor, as well as the rolls of each roll conveyor unit which are aligned straight and rotatably held by a frame to provide an integral straight conveyor having one flat conveyance surface. Thus, it is possible to provide the second conveyance route with a continuous, concave conveyance surface by suitably adjusting the first and second adjusting devices, as explained hereinafter.

Similarly, it is possible to provide the first conveyance route with a smooth horizontal conveyance surface by suitably adjusting the first and second adjusting devices to make the disk roll conveyor and the roll conveyor units have their respective horizontal positions. It can be said that the roll conveyor set, which is formed of the roll conveyor units, has a structure bendable at a boundary between two adjacent roll conveyor units. In case that the switching operation between the first and second conveyance routes is automated in accordance with the type of curved glass sheets, it becomes easy to prepare a particular conveyance route that is special to one type of curved glass sheets having a particular curvature. Furthermore, it becomes easy to conduct a maintenance operation of the apparatus, and it is possible to provide a suitable conveyance route, in which glass sheets of a compound curvature hardly stuck, even if the level of the outlet of a quenching unit (positioned immediately upstream of the disk roll conveyor) is considerably different from that of a horizontally fixed roll conveyor (positioned immediately downstream of the roll conveyor set) of a subsequent step.

The disk roll conveyor has a plurality of disk rolls (each being covered with a heat-resistant resin). These disk rolls are aligned in a transverse plane perpendicular to the conveyance direction of the curved glass sheet to provide a plurality of rows (e.g., sixteen rows in FIG. 3) and also aligned in the conveyance direction to provide a plurality of lines (e.g., five lines in FIG. 2). The disk rolls aligned in a line are rotatably supported on a vertical plate member of a disk roll unit to have a predetermined distance between two adjacent disk rolls. In other words, two adjacent rows of the disk rolls are away from each other to have a predetermined distance (see FIG. 3). The disk roll unit has a plurality of vertical plate members (in number corresponding to the number of the lines of the disk rolls), which extend in the conveyance direction, to have a distance between two adjacent plate members (see FIG. 2).

In the disk roll conveyor, one disk roll is sufficiently spaced away from its surrounding disk rolls. Therefore, when a curved glass sheet is broken by accident upon coming out of the quenching unit, it is possible to make broken pieces of the curved glass sheet to fall down to the floor 15 without delay. Each disk roll is covered at its periphery with a heat-resistant resin, and each row of disk rolls are disposed in the transverse plane such that their apexes conform to a convexly curved envelope that substantially corresponds to the bottom surface contour of the curved glass sheet (see FIG. 2). Thus, it is possible to have a large contact area and a large friction resistance between the disk rolls and the curved glass sheet. With this, it is possible to prevent curved glass sheets from slipping down from the downslope of the second conveyance route. Furthermore, it is possible to more effectively move curved glass sheets downstream by the disk rolls from a disk roll conveyor region (above the disk roll conveyor) to a first (upstream end) roll conveyor unit region (above the first roll conveyor unit).

The disk roll conveyor is disposed on a frame, and the disk roll conveyor can be adjusted to have a downward slope by setting the level of a downstream side of the frame to be lower than that of an upstream side of the frame. A height adjusting device on an upstream side of the disk roll conveyor is formed with a rotating shaft in the transverse direction. This rotating shaft is equipped with a mechanism for rotating the frame in a manner to incline the frame as the level of the downstream side of the frame lowers. Thus, it is easily possible to adjust the inclination angle of the conveyance surface of the disk roll conveyor by the above-mentioned adjusting device (first adjusting device) of the disk roll conveyor.

In case of producing new glass sheets having a different curvature defined in the transverse plane, it is preferable to suitably change the apex positions of each row of the disk rolls such that the newly positioned apexes also conform to a new convexly curved envelope substantially corresponding to the bottom surface of the new glass sheets. During curved glass sheets are conveyed in the furnace and the quenching unit, they are inclined toward a driving chain for conveying curved glass sheets. Thus, in view of this inclination, the apex positions of the disk rolls are suitably set. The inclination of the disk roll conveyor relative to horizontal in the transverse plane is adjusted by only the apex positions of the disk rolls. The frame of the disk roll conveyor is always horizontally maintained in the transverse plane.

The roll conveyor set is positioned immediately downstream of the disk roll conveyor for smoothly conveying curved glass sheets from the disk roll conveyor side to the roll conveyor set side. The roll conveyor set is composed of a plurality of roll conveyor units (e.g., five units in FIG. 1) and is bendable at each boundary F between two adjacent roll conveyor units. Roll conveyor units are integrally mounted on their respective frames. It is possible to independently adjust the levels of four corner portions of each frame by a height adjusting device (the second adjusting device). One roll of each roll conveyor unit also serves as a rotating shaft of the frame. Thus, when the inclination angle of the roll conveyor unit relative to the horizontal conveyance direction is changed by adjusting the levels of the four corner portions, the roll conveyor unit is rotated around the rotating shaft. It is easily possible to adjust the inclination angle of the conveyance surface of each roll conveyor unit by the above-mentioned height- and angle-adjusting device (the second adjusting device).

In producing curved glass sheets of a different curvature (having a simple curvature or compound curvature), it is easily possible to conduct a switch between (a) the first conveyance route, in which the disk roll conveyor and each roll conveyor unit are in a horizontal position and (b) the second conveyance route, in which the disk roll conveyor is in a downward position and in which at least one (preferably at least two) roll conveyor unit(s) at a downstream side of the roll conveyor set is in an upward position to provide a continuous concave conveyance surface, that is, V-shaped concave conveyance route (see FIG. 1), extending from the upstream end of the disk roll conveyor to the downstream end of the roll conveyor set, by suitably operating the first and second adjusting devices. In the second conveyance route, for example, it is optional to set all of the roll conveyor units to have an upward position(s). In this case, a downslope is formed by only the disk roll conveyor. As another example (see FIGS. 1 and 7), it is optional to set only the upstream-end (first) roll conveyor unit to have a downward position and to set the other remaining downstream roll conveyor units to have an upward position(s). In this case, a downslope is formed by only the disk roll conveyor and the first roll conveyor unit. If the data of the levels of respective positions of the first and second conveyance routes are previously recorded in a memory of the first and second adjusting devices, it is possible to automatically quickly complete the above switch by energizing an actuator (e.g., a screw jack), based on the recorded data.

According to the present invention, it is possible to adjust the slope angle of the conveyance surface by suitably changing the respective levels of the four corner portions of each roll conveyor unit. Therefore, it is possible to provide the second conveyance route with a conveyance surface in which adjacent roll conveyor units are positioned relative to each other to have a substantially continuous boundary therebetween (see FIG. 1). With this, it is possible to smoothly convey curved glass sheets without delay. Furthermore, it is possible to provide the second conveyance route, which is capable of conveying curved glass sheets without delay, by having a small difference at each boundary F (see FIG. 1) between the inclination angles (to horizontal) of two adjacent roll conveyor units in the downslope or upslope, or between the inclination angles (to horizontal) of the disk roll conveyor and the first roll conveyor unit in the downslope, but except the V-shaped boundary bottom F. In other words, it is possible to provide such second conveyance route, for example, by making the interior angle defined between two adjacent roll conveyor units closer to 180 degrees. This difference may be 7 degrees or less, preferably 6 degrees or less, more preferably 5 degrees or less. In other words, the interior angle defined between two adjacent roll conveyor units or between the disk roll conveyor and the first roll conveyor unit may be 173 degrees or greater, preferably 174 or greater, more preferably 175 degrees or greater. The length of the disk roll conveyor or each roll conveyor unit in the conveyance direction is preferably at least a half of the length of commonly produced glass sheets having a compound curvature.

As stated above, the roll conveyor set has a structure bendable at a boundary F between two adjacent roll conveyor units. In contrast, the disk roll conveyor does not have such bendable structure. If it were provided with such bendable structure, the disk roll conveyor mechanism would be too complex.

Figure 2:
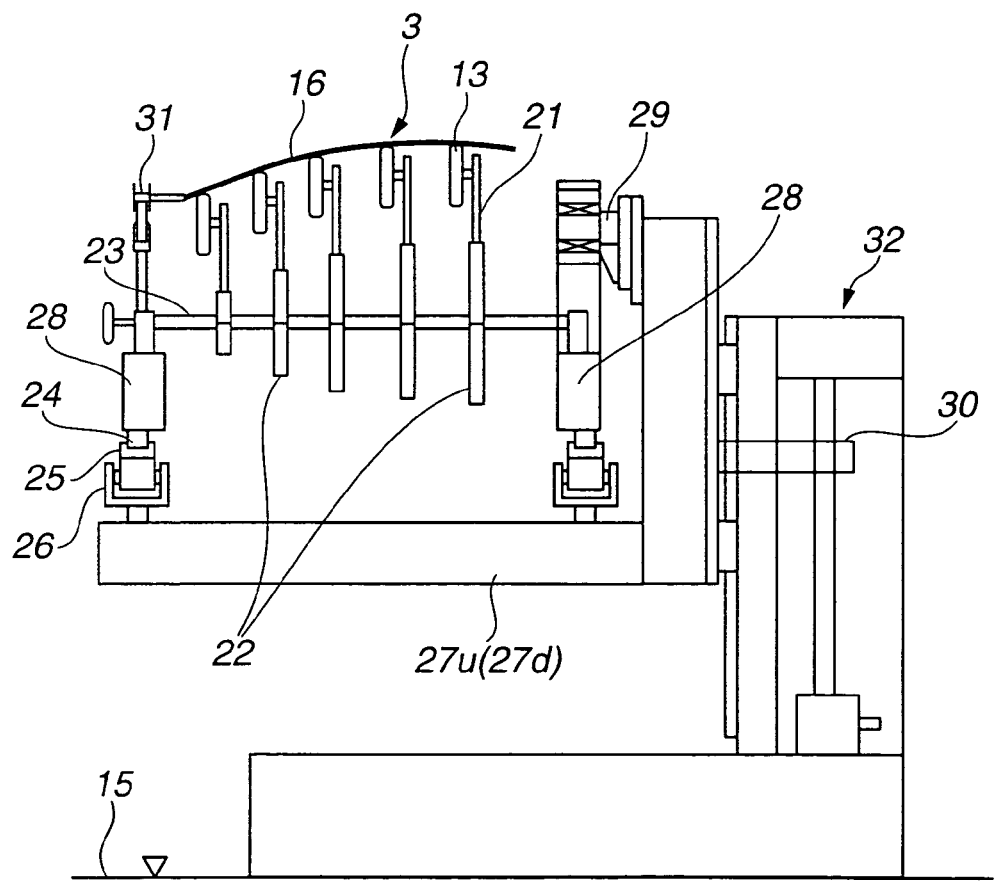
FIG. 2 is a schematic sectional view, showing a disk roll conveyor of the apparatus, taken along a transverse direction perpendicular to the conveyance direction.

The levels of each row of disk rolls are adjusted such that respective apexes of each row of disk rolls conform to a convexly curved envelope substantially corresponding to the bottom surface contour of curved glass sheets (see FIG. 2).

This envelope is inclined toward one side (the driving chain side) in the transverse plane, by an angle of, for example, about 3 degrees to about 5 degrees. Thus, at least two roll conveyor units near the disk roll conveyor are set to similarly incline the axes of the rolls of the at least two roll conveyor units toward the one side. These rolls are rotatably supported by their bearing mechanisms such that the rolls have angles that gradually decrease until horizontal by traveling downstream from the upstream end roll of the upstream end roll unit. At least the inclined rolls are formed at their longitudinal ends with disk-shaped collars for supporting an end surface of curved glass sheets. Thus, curved glass sheets during conveyance are provided with a sufficient frictional force by a contact with the disk-shaped collars and by a contact with a cylindrical major surface of each roll. Therefore, the curved glass sheets are conveyed downward or upward without slipping down.

With reference to FIGS. 1-7, the conveyance apparatus according to the present invention will be descried in detail, as follows.

As is seen from FIG. 1, it is possible to convey a glass sheet 16 of a compound curvature by the apparatus without delay by setting the second conveyance route between the outlet of a quenching unit 2 and a horizontally fixed roll conveyor 10 of a subsequent step. This apparatus can be easily and quickly switched from the second conveyance route to the first conveyance route and vice versa by adjusting the level and the inclination angle of each of the disk roll conveyor 3 and of the first to fifth roll conveyor units 5-9. In fact, a glass sheet 16 of a compound curvature is moved downward over the disk roll conveyor 3 from the outlet of a lower air blower 12, then transferred to an area of the first roll conveyor unit 5 of the roll conveyor set 4, then sequentially traveling through areas of the second to fifth conveyor units 6-9, and then finally transferred to the horizontally fixed roll conveyor 10.

Figure 3:
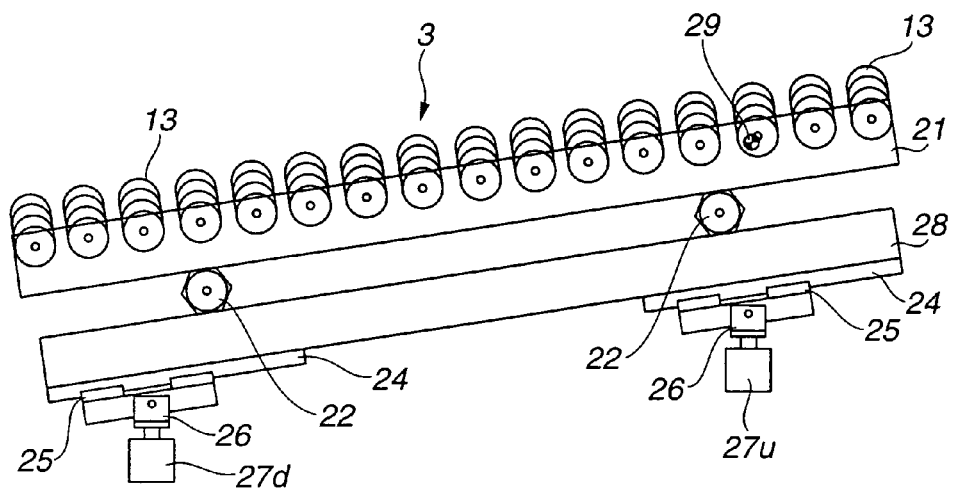
FIG. 3 is an enlarged side view showing the disk roll conveyor.

As is seen from FIGS. 2 and 3, the disk roll conveyor 3 has two camshafts 23 stretching across the conveyor frame 28, vertical plates (constituting a disk roll unit 21) having bottom surfaces in abutment with corresponding cams 22 fixed on each camshaft 23, and lines of disk rolls 13. Each line of disk rolls 13 (see FIG. 3) in the conveyance direction is rotatably supported on the corresponding vertical plate of the disk roll unit 21. Each cam 22 has a polyhedral (polygonal) shape. The first to fifth cams 22 are disposed on each camshaft 23 to have a predetermined distance between two adjacent cams 22 in the transverse direction. The distance between the axis of the camshaft 23 and each edge surface of each cam 22 is set to a particular distance. Therefore, it is possible to set the level of each vertical plate of the disk roll unit 21 at a particular level by suitably rotating the camshaft 23 in a manner to select a particular row of cam edge surfaces that support the respective vertical plates. That is, it is possible to suitably set the levels of apexes of each row of the disk rolls 13 at particular levels.

As is seen from FIG. 3, each vertical plate of the disk roll unit 21 is supported at its upstream and downstream sides on two cams 22 (aligned in the conveyance direction) having the same size and the same shape. These two cams 22 are secured to the two camshafts 23 such that the distance between one camshaft axis and the corresponding cam edge surface is the same as that between the other camshaft axis and the corresponding cam edge surface at the same angular positions of these two camshafts 23. With this, each line of disk rolls 13 in the conveyance direction are equidistantly spaced away from the camshafts 23 or conveyor frame 28. Furthermore, each row of cams 22, which are disposed in the same number (five in FIG. 2) as that of the vertical plates of the disk roll unit 21, is such that respective apexes of each row of the disk rolls 13 conform to a convexly curved envelope substantially corresponding to the bottom surface contour of a curved glass sheet at a predetermined angular position of each camshaft 23. By synchronously changing the angular positions of the two camshafts 23, it is possible to provide various convexly curved envelopes that are special to particular curved glass sheets.

Although not shown in the drawings, each vertical plate of the disk roll unit 21 is formed with a plurality of U-shaped cutout grooves (with certain distances) extending from the bottom surface toward the top surface of each vertical plate, and a shaft is passed through a row of cutout grooves in the transverse direction. Furthermore, each shaft is passed through a plurality of pipes each having a width greater than that of the grooves and an axial length such that each vertical plate fits between two adjacent pipes. Thus, the number of the pipes is greater than that of the vertical plates by one. By clamping together the shaft, the pipes and the vertical plates from outside in the transverse direction, it is possible to make the disk roll unit have an integral rigid body. Although a clamp is not shown in the drawings, it is mounted on the conveyor frame 28 of the disk roll conveyor 3. Therefore, upon the above clamping, the disk roll unit 21 is also fixed to the conveyor frame 28.

By loosening the clamp, the vertical plates of the disk roll unit 21 become movable up and down to the extent that the shaft is in the U-shaped cutout grooves. Under this condition, it is possible to adjust the level of the vertical plates, as follows. At first, the disk roll unit 21 (together with the shafts) in abutment with the top surfaces of the cams 22 is moved upward using a jack (not shown in the drawings) to detach the disk roll unit 21 from the cams 22. Under this condition, the camshafts 23 are rotated to select desired top surfaces having desired levels. With this, it is possible to select particular apex levels of the disk rolls 13 that correspond to a certain glass curvature, thereby forming a convexly curved envelope inclined toward one side (the driving chain side) in the transverse plane by an angle of, for example about 3 degrees to about 5 degrees.

FIG. 3 shows a side view of the disk roll conveyor 3. The first adjusting device for adjusting height and inclination angle of the disk roll conveyor 3 has the following construction. As is seen from FIGS. 2 and 3, the entirety of the disk roll conveyor 3 (including the conveyor frame 28) is supported on two L-shaped brackets 27u, 27d in a manner that slide rails 24 on the bottom of the conveyor frame 28 are slidably engaged with bearing guides 25 that are attached to the L-shaped brackets 27u, 27d through link mechanisms 26. The L-shaped brackets 27u, 27d are movable up and down by an elevator mechanism 32 equipped with screw jacks 30 (see FIG. 2) that are rotated by an electric motor. A rotation shaft 29 is provided at a position above the L-shaped bracket 27u of the upstream side and is supported on the conveyor frame 28.

To downwardly incline the disk roll conveyor 3, the L-shaped bracket 27d of the downstream side is lowered. With this, the conveyor frame 28 (the disk roll conveyor 3) is rotated about the rotation shaft 29. To follow the movement in the conveyance direction under an inclined condition, the conveyor frame 28 is slidably engaged with the L-shaped bracket 27d through the slide rails 24 and the bearing guides 25. To achieve a free inclination of the conveyor frame 28 relative to the L-shaped bracket 27d, the link mechanism 26 is provided between the bearing guides 25 and the L-shaped bracket 27d.

Figure 4:
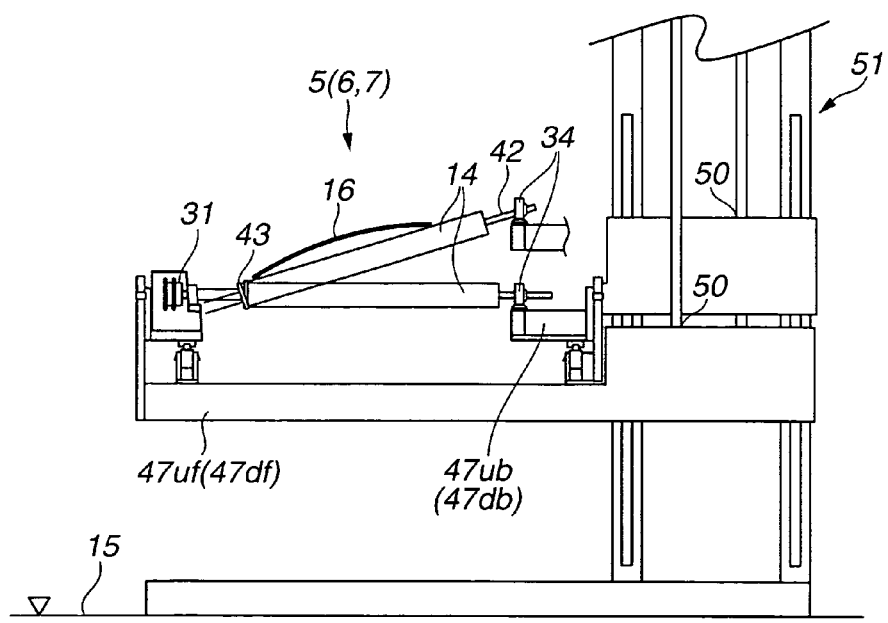
FIG. 4 is a view similar to FIG. 2, but showing one roll conveyor unit of the apparatus.

FIG. 4 shows a schematic sectional view of one roll conveyor unit 5, 6 or 7. Each roll conveyor unit has the second adjusting device, which is capable of independently adjusting the levels of four corner portions of each roll conveyor unit. The second adjusting device has a mechanism similar to that of the first adjusting device. In fact, the second adjusting device has four L-shaped brackets 47 (47uf, 47ub, 47df, 47db), which respectively support the four corner portions of each roll conveyor unit. The level of each L-shaped bracket 47 can independently be adjustable up and down by an elevation mechanism 51 equipped with a screw jack 50. By maintaining the right upstream corner portion 47ub and the right downstream corner portion 47db at levels respectively higher than those of the left upstream corner portion 47uf and the left downstream corner portion 47df with respect to the conveyance direction, there is provided a roll conveyor conveyance surface that is downwardly inclined toward the side of the disk-shaped collars 43 of the rolls 14. Herein, "right" and "left" are defined upon facing downstream of the conveyance route.

The shaft of the roll 14 is rotatably supported by a bearing disposed on the side of a sprocket 31 (meshed with a drive chain for driving the rolls 14) in a manner to suppress the movement of the roll 14 in the axial direction. In contrast, the shaft of the roll 14 is rotatably supported by a bearing 34 on the other side in a manner to allow the relative movement of the roll in the axial direction. Therefore, it is possible to freely adjust the inclination angles of the rolls 14 by setting relative positions of the four L-shaped brackets 47 of each roll conveyor unit.

Figure 5:
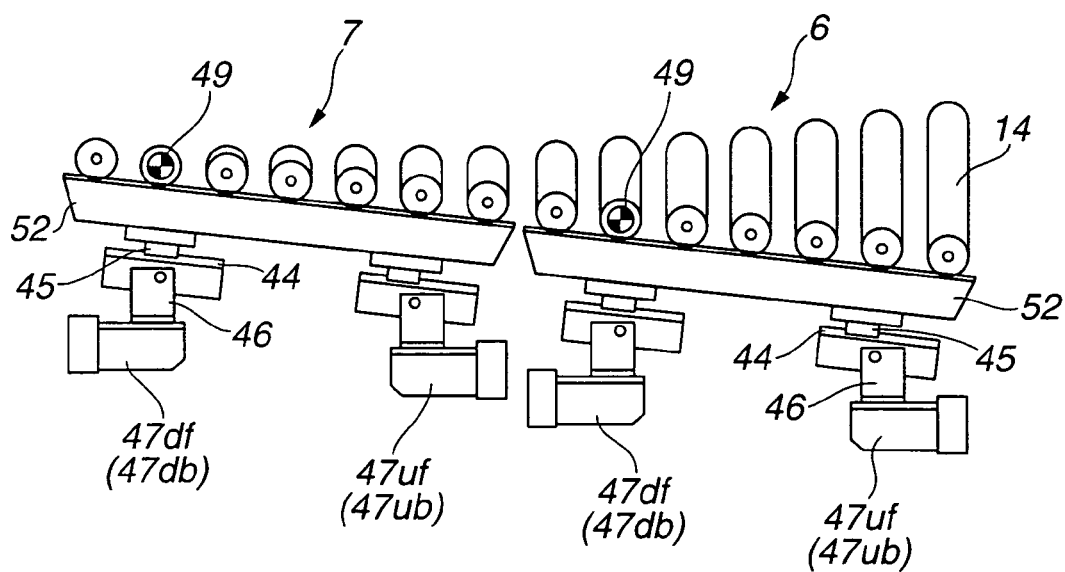
FIG. 5 is an enlarged, schematic side view showing the second and third roll conveyor units.

FIG. 5 is a side view showing the second and third roll conveyor units 6 and 7. The rolls of the first to third roll conveyor units 5, 6, 7 have angles that gradually decrease until horizontal by traveling downstream from the upstream end roll of the first roll unit 5. This upstream end roll may have an angle of about 3 degrees to about 5 degrees. It should be noted that the angles of the inclined rolls 14 are exaggerated in FIG. 5 for the purpose of illustration.

A conveyance surface of each roll conveyor unit, which is inclined in the conveyance direction, can be formed by making the levels of the four L-shaped brackets 47 different. For example, it is possible to obtain a conveyance surface of the second roll conveyor unit 6 as shown in FIG. 5 by having in descending order the levels of the right upstream bracket 47ub, the right downstream bracket 47db, the left downstream bracket 47df, and the left upstream bracket 47uf with respect to the conveyance direction toward downstream. When the roll conveyor unit is inclined in the conveyance direction, the shaft of one roll disposed at a downstream side of the roll conveyor unit (e.g., the second roll from the downstream end of the roll conveyor unit) also serves as a rotation shaft 49 for inclining the roll conveyor unit. A conveyor frame 52 of the roll conveyor unit is supported on four L-shaped brackets 47 in a manner that slide rails 44 on the bottom of the conveyor frame 52 are slidably engaged with bearing guides 45 that are attached to the L-shaped brackets 47 through link mechanisms 46. The L-shaped brackets 47 are movable up and down by an elevator mechanism equipped with screw jacks.

The fourth and fifth roll conveyor units 8, 9, which do not require a leftward inclination toward the side of the roll collars 43, can be adjusted by using only two L-shaped brackets on upstream and downstream sides. Furthermore, the fifth roll conveyor unit 9, which is disposed immediately upstream of the horizontally fixed roll conveyor 10, may have a simpler mechanism, in which an adjusting device for adjusting the level of the downstream side is omitted, and in which the downstream end roll shaft of the fifth roll conveyor unit 9 also serves as a rotation shaft for inclining the conveyance surface of the fifth roll conveyor unit 9.

Figure 6:
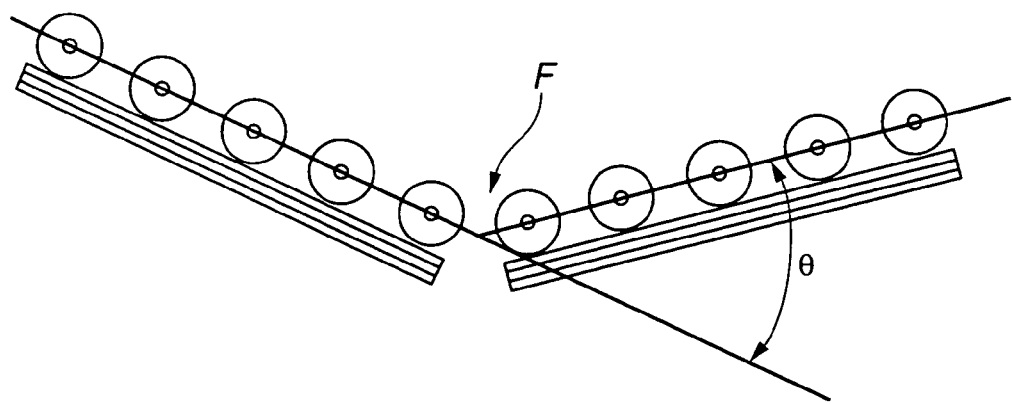
FIG. 6 is an enlarged, schematic side view showing an essentially V-shaped boundary bottom F in the second conveyance route.

FIG. 6 shows a V-shaped boundary bottom F of the second conveyance route, which is defined, for example, between the first and second roll conveyor units 5, 6. In this case, the total θ of the angle of the first roll conveyor unit 5 to horizontal and the angle of the second roll conveyor unit 6 to horizontal may be 7 degrees or less, preferably 5 degrees or less. In other words, the interior angle (180 degrees minus θ) defined between the first and second roll conveyor units 5 and 6 may be 173 degrees or greater, preferably 175 degrees or greater. With this, it is possible to prevent curved glass sheets from stucking at the V-shaped boundary bottom F of the second conveyance route.

Hereinafter, an explanation will be given of an apparatus and a method for conveying curved glass sheets in accordance with the present invention based on the following exemplary embodiments with reference to the drawings.

Figure 7:
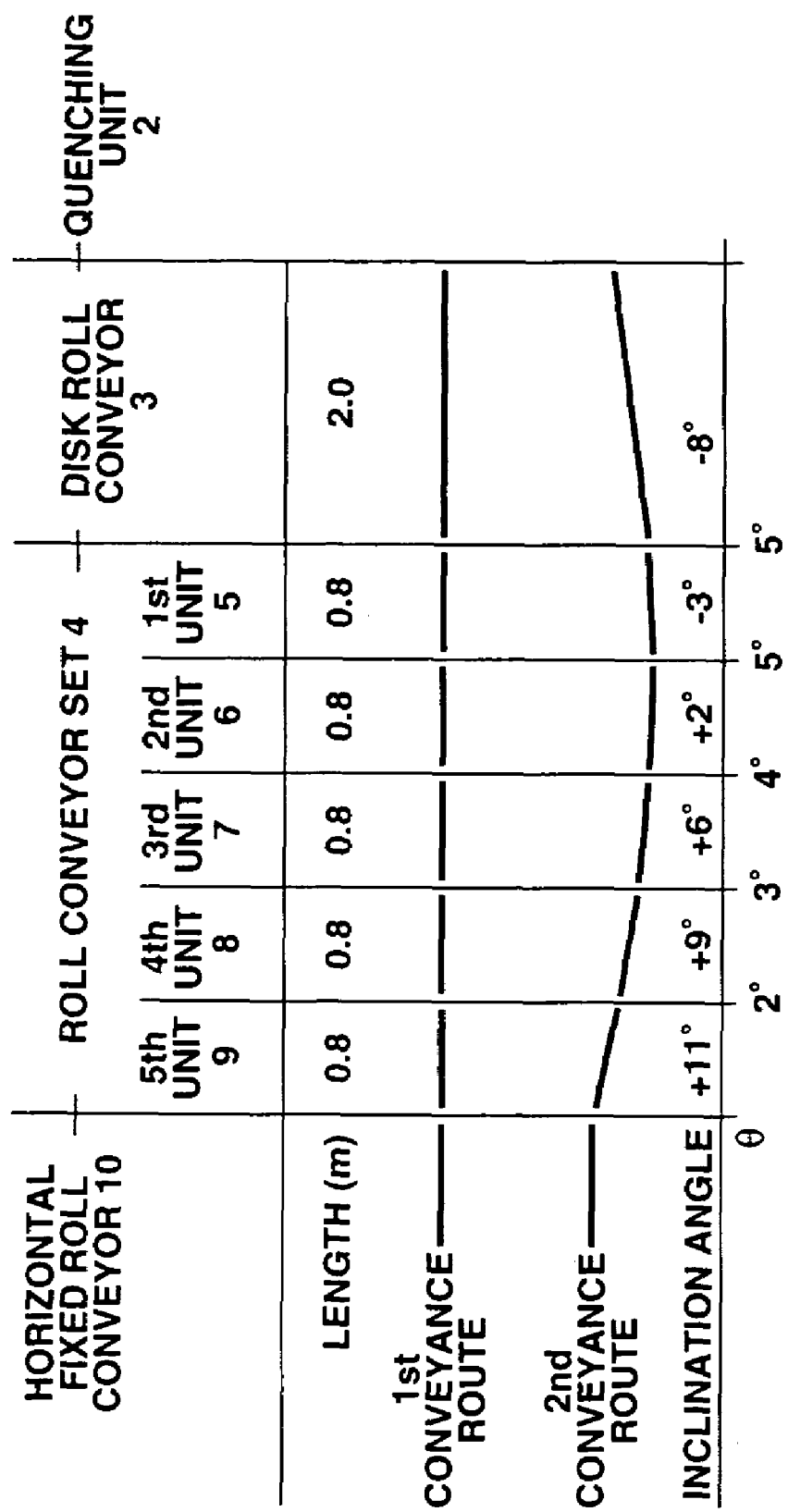
FIG. 7 is a schematic side view showing respective dispositions of the disk roll conveyor and each roll conveyor unit in the first and second conveyance routes.

The first embodiment of the present invention will be described in detail, as follows. FIG. 7 shows a schematic side view of respective dispositions of the disk roll conveyor and each roll conveyor unit in the first and second conveyance routes. There is provided a distance of about 6.3 m between the outlet of the quenching unit 2 and the inlet (the upstream end) of the horizontally fixed roll conveyor 10. In the first conveyance route, the disk roll conveyor having a length of about 2 m along the horizontal conveyance direction and the first to fifth roll conveyor units 4 (5-9), each having a length of about 0.8 m along the horizontal conveyance direction, are horizontally disposed such that curved glass sheets are horizontally conveyed in the first conveyance route. A suitable clearance is provided between the disk roll conveyor and the first roll conveyor unit 5 and between two adjacent roll conveyor units to prevent abutment between their adjacent end portions. In FIG. 7, the inclination angle of each conveyance surface is expressed as a negative value when it is downwardly inclined or as a positive value when it is upwardly inclined.

In contrast, the second conveyance route has a vertical distance of about 0.4 m between its highest level and the V-shaped boundary bottom, while it has a horizontal distance of about 6.3 m. In the case of the second conveyance route, upper and lower air blowers 11, 12 of the quenching unit are set such that curved glass sheets are downwardly moved therethrough (see FIG. 1) to have a downward inclination angle. This inclination angle is suitably adjusted depending on, for example, radius of curvature of curved glass sheets and/or the shape of the final hearth bed in the furnace 1. Then, the conveyance surface of the disk roll conveyor is made to have a downward inclination angle of about 8 degrees relative to horizontal in a manner to substantially align the conveyance surface of the disk roll conveyor with the inclined surface of the curved glass sheet path in the quenching unit. Similarly, the first roll conveyor unit 5 is made to have a downward inclination angle of about 3 degrees so that the difference between the inclination angle of the disk roll conveyor 3 and that of the first roll conveyor unit 5 is set to about 5 degrees. The second roll conveyor unit 6 is made to have an upward inclination angle of about 2 degrees. Thus, the total of the downward inclination angle (about 3 degrees) of the first roll conveyor unit and the upward inclination angle (about 2 degrees) of the second roll conveyor unit is set to about 5 degrees. The remaining roll conveyor units are made to have respective upward inclinations as shown in FIG. 7. A convex boundary is necessarily formed between the fifth roll conveyor 9 and the horizontal fixed roll conveyor 10. Therefore, curved glass sheets do not stuck at this convex boundary. It is thus not necessary to intentionally adjust the angle between the fifth roll conveyor 9 and the horizontal fixed roll conveyor 10.

The above exemplary second conveyance route was used for conveying a curved glass sheet having a length of 823 mm, a width of 518 mm, a thickness of 4.0 mm, a first radius of curvature of 24000 mm relative to the conveyance direction, and a second radium of curvature of 1240 mm relative to the transverse direction. With this, the curved glass sheet was smoothly conveyed without stucking at the V-shaped boundary bottom F. If the level of the outlet of the quenching unit is changed by altering the radium of curvature of the curved glass sheet relative to the conveyance direction, the height and the inclination angle of the disk roll conveyor and of each roll conveyor unit are suitably changed such that at each boundary F (except the V-shaped boundary bottom F) the difference between the angles (to horizontal) of two adjacent roll conveyor units in the downslope or upslope or between the angles (to horizontal) of the disk roll conveyor and the first roll conveyor unit in the downslope is 7 degrees or less, preferably 6 degrees or less, more preferably 5 degrees or less, and that the above-defined total angle (θ) at the V-shaped boundary bottom F (see FIG. 6) is 7 degrees or less, preferably 5 degrees or less.

As the second embodiment of the present invention, operations upon switching the first conveyance route to the second conveyance route will be described in detail, as follows. Firstly, hearth beds are switched to particular ones special to a curved glass sheet of a particular compound curvature. Then, the quenching unit 2, which is disposed downstream of the furnace 1, is switched to one special to the curved glass sheet, and the inclination angles of the upper and lower air blowers 11, 12 are respectively adjusted in order to allow the curved glass sheet to pass therethrough. In fact, the upper and lower air blowers 11, 12 are installed in a manner to allow pivotal movements about pivot shafts on their upstream sides. It is easily possible to set the inclination angles of the upper and lower air blowers 11, 12 to have predetermined angles, based on corresponding downstream heights of the upper and lower air blowers.

Then, the clamp (not shown in the drawings), which pressingly holds the vertical plates (each supporting thereon a line of disk rolls 13 of the disk roll conveyor) of the disk roll unit 21, is released, and then the entirety of the disk roll unit 21 is lifted up by a jack (not shown in the drawings) in order to detach the vertical plates from the corresponding top surfaces of the cams 22. Then, each camshaft 23 of the disk roll conveyor 3 is rotated by a predetermined degree such that the new apexes (obtained by this rotation) of each row of the disk rolls conform to a convexly curved envelope substantially corresponding to the bottom surface contour of the new curved glass sheet. Then, the entirety of the disk roll unit 21 is lowered by the jack in order to place the vertical plates on the respective top surfaces of the cams 22. After that, the clamp is again fastened in a manner to pressingly hold the vertical plates together.

Then, the inclination angle of the disk roll conveyor 3 is adjusted, as follows. Firstly, the levels of the upstream and downstream L-shaped brackets 27*u*, 27*d* are lowered in order to lower the conveyor frame 28 to the level of the outlet of the quenching unit 2. In fact, the level of the upstream L-shaped bracket 27*u* is adjusted such that the level of the upstream end of the disk roll conveyor becomes slightly lower than that of the downstream end of the top surface of the lower air blower 12. The level of the downstream L-shaped bracket 27*d* is set to be lower than that of the upstream L-shaped bracket 27*u* such that the inclination angle of the entire frame of the disk roll conveyor becomes substantially the same as that of the downstream end portion of the top surface of the lower air blower 12.

Then, the inclination angle of the first roll conveyor unit 5 is adjusted, as follows. The levels of the upstream right and upstream left, two L-shaped brackets 47*uf*, 47*ub* are lowered to set the level of the upstream end of the first roll conveyor unit 5 to be the same as or slightly lower than that of the downstream left end of the disk roll conveyor 3. Then, the levels of the downstream right and left, two L-shaped brackets 47*df*, 47*db* are lowered such that the downward inclination of the conveyance surface of the first roll conveyor unit relative to the horizontal conveyance direction is made to be less than that of the conveyance surface of the disk roll conveyor by an angle of about 7 degrees or less, preferably about 5 degrees or less.

Then, the first roll conveyor unit 5 is inclined leftward relative to the transverse direction by respectively setting the levels of the right upstream and right downstream, two L-shaped brackets 47*ub*, 47*db* to be higher than those of the left upstream and left downstream, two L-shaped brackets 47*uf*, 47*df*. Specifically, the difference between the level of the right downstream L-shaped bracket 47*db* and that of the left downstream L-shaped bracket 47*df* is made to be less than that between the level of the right upstream L-shaped bracket 47*ub* and that of the left upstream L-shaped bracket 47*uf*. With this, the inclination angles of the rolls of the first roll conveyor unit relative to the transverse direction are set to decrease gradually along the conveyance direction.

Similar to the above-explained adjustment of the first roll conveyor unit 5, the second to fifth roll conveyor units 6-9 are set to have their respective heights and inclination angles.

It is possible to quickly set up a second conveyance route, which is special to glass sheets having a particular compound curvature, by recording the data of the level of each L-shaped bracket of the disk roll conveyor and the roll conveyor units in a memory, then by reading the recorded data, and then actuating each L-shaped bracket, in accordance with the recorded data, to have such level.

The entire contents of Japanese Patent Application No. 2003-188219 (filed Jun. 30, 2003), of which priority is claimed in the present application, are incorporated herein by reference.

What is claimed is:

1. An apparatus for conveying a curved glass sheet quenched by a quenching device, the apparatus comprising:
    a disk roll conveyor connected with a downstream end of the quenching device, the disk roll conveyor having (a) a plurality of disk rolls for conveying the curved glass sheet and (b) a conveyor frame on which the disk rolls are supported;
    a first adjusting device for adjusting a height and an inclination angle of a conveyance surface of the disk roll conveyor, the first adjusting device having an elevation mechanism, and two brackets arranged to move up and down by the elevation mechanism; and
    a roll conveyor set positioned downstream of the disk roll conveyor, the roll conveyor set having a plurality of roll conveyor units, each unit having (a) a plurality of rolls for conveying the curved glass sheet and (b) a second adjusting device for adjusting a height and an inclination angle of a conveyance surface of each unit, the second adjusting device having four brackets, each bracket being independently adjustable up and down by an elevation mechanism, wherein
    the conveyor frame of the disk roll conveyor is supported at its upstream and downstream sides on the two brackets of the first adjusting device, respectively, such that the disk roll conveyor is capable of having a horizontal or downward position, each roll conveyor unit is supported at its four corner portions on the four brackets of the second adjusting device, respectively, and the first and second adjusting devices are operable to provide the curved glass sheet with (a) a first conveyance route in which the disk roll conveyor and each roll conveyor unit are in a horizontal position to provide a smooth horizontal conveyance surface extending from an upstream end of the disk roll conveyor to a downstream end of the roll conveyor set, or (b) a second conveyance route in which the disk roll conveyor is in a downward position and in which at least one roll conveyor unit at a downstream side of the roll conveyor set is in an upward position to provide a continuous concave conveyance surface extending from the upstream end of the disk roll conveyor to the downstream end of the roll conveyor set, wherein the disk roll conveyor comprises:

a first row of disk rolls aligned in a transverse plane perpendicular to a conveyance direction of the curved glass sheet;

a support member for rotatably supporting a disk roll on the first row of disk rolls; and a cam member in engagement with the support member to adjust a height of the first row of disk rolls such that respective apexes of the first row of disk rolls conform to a convexly curved envelope substantially corresponding to a bottom surface contour of the curved glass sheet, wherein the disk roll conveyor further comprises at least a second row of disk rolls that are aligned in the transverse plane and are away from the first row of disk rolls by a distance in the conveyance direction, wherein at least first and second lines of disk rolls are provided in the conveyance direction by the first and second rows of disk rolls, wherein the support member comprises at least first and second supporting plates that respectively rotatably support each disk roll of the at least first and second lines of disk rolls, and wherein each cam member is in abutment with a bottom surface of each of the at least first and second supporting plates.

2. An apparatus according to claim 1, wherein in the second conveyance route at least two roll conveyor units at the downstream side of the roll conveyor set are in an upward position to provide the continuous concave conveyance surface.

3. An apparatus according to claim 1, wherein, when a bottom of the continuous concave conveyance surface of the second conveyance route is defined between the disk roll conveyor and an upstream end roll conveyor unit of the roll conveyor set, a first total of an angle of the disk roll conveyor to horizontal and an angle of the upstream end roll conveyor unit to horizontal is 7 degrees or less, and wherein, when the bottom is defined between one roll conveyor unit and another roll conveyor unit immediately downstream of the one roll conveyor unit, a second total of an angle of the one roll conveyor unit to horizontal and an angle of the another conveyor unit to horizontal is 7 degrees or less.

4. An apparatus according to claim 3, wherein each of the first and second totals is independently 5 degrees or less.

5. An apparatus according to claim 1, wherein the disk roll conveyor connects between the quenching unit that quenches the curved glass sheet and the roll conveyor set, and wherein the roll conveyor set connects the roll disk conveyor and an upstream end of another roll conveyor that is horizontally fixed.

6. An apparatus according to claim 1, wherein the convexly curved envelope is inclined at a first angle relative to a transverse horizontal direction that is defined in the transverse plane, wherein an upstream end roll of an upstream end roll conveyor unit of the roll conveyor set is inclined at a second angle, which is substantially the same as the first angle, relative to the transverse horizontal direction such that the curved glass sheet is smoothly transferred from a downstream end of the disk roll conveyor to the upstream end roll of the upstream roll conveyor unit, wherein at least a plurality of remaining rolls of the upstream end roll conveyor unit which are other than the upstream end roll of the upstream end roll conveyor unit are supported such that the remaining rolls have angles that gradually decrease until horizontal along the conveyance direction, and wherein at least the upstream end roll of the upstream end roll conveyor unit is formed at a longitudinal end with a disk-shaped collar for supporting an end surface of the curved glass sheet.

7. An apparatus according to claim 1, wherein the continuous concave surface of the second conveyance route has a bottom, and the disk roll conveyor and the roll conveyor set convey the curved glass sheet from the upstream end of the disk roll conveyor through the bottom to the downstream end of the roll conveyor set.

* * * * *